Jan. 4, 1944.　　J. A. FORBES　　2,338,502
BRAKE
Filed June 4, 1942　　2 Sheets-Sheet 1

INVENTOR.
JOSEPH A. FORBES
BY
ATTORNEYS

Jan. 4, 1944. J. A. FORBES 2,338,502
BRAKE
Filed June 4, 1942 2 Sheets-Sheet 2
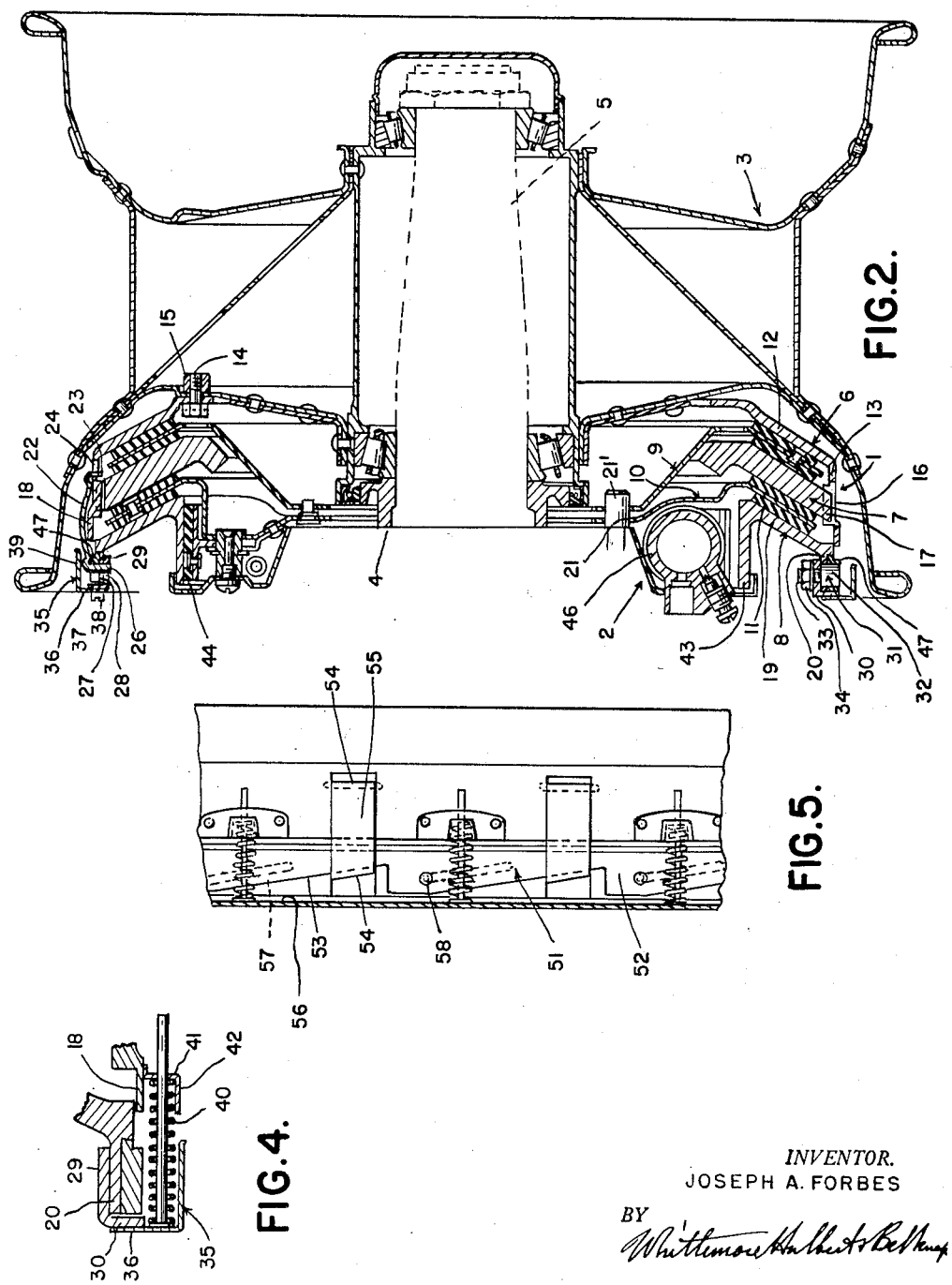
INVENTOR.
JOSEPH A. FORBES
BY
ATTORNEYS Patented Jan. 4, 1944

2,338,502

UNITED STATES PATENT OFFICE 2,338,502

BRAKE

Joseph A. Forbes, Detroit, Mich., assignor to John Sneed, Royal Oak, Mich.

Application June 4, 1942, Serial No. 445,764

6 Claims. (Cl. 188—140)

The invention relates to brakes and refers more particularly to brakes of that type having rotatable friction elements or members relatively movable toward each other to apply the brake.

The invention has for one of its objects to provide a brake in which the rotatable friction elements or members may be adjusted toward and away from each other independently of the means for yieldably moving the rotatable friction elements or members away from each other to release the brake.

The invention has for another object to provide an improved brake in which the means for relatively moving the rotatable friction elements or members toward each other is used to relieve one of the rotatable friction elements or members during adjustment from stress of the yieldable separating means.

With these and other objects in view, the invention resides in the novel features of construction and combinations and arrangements of parts as more fully hereinafter set forth.

In the drawings:

Figure 1 is an inboard elevation, partly broken away and in section, of a brake embodying the invention;

Figures 2 and 3 are cross sections on the lines 2—2 and 3—3, respectively, of Figure 1;

Figure 4 is a cross section on the line 4—4 of Figure 3;

Figure 5 is a view similar to Figure 3 showing another embodiment of the invention.

Figures 1, 3:
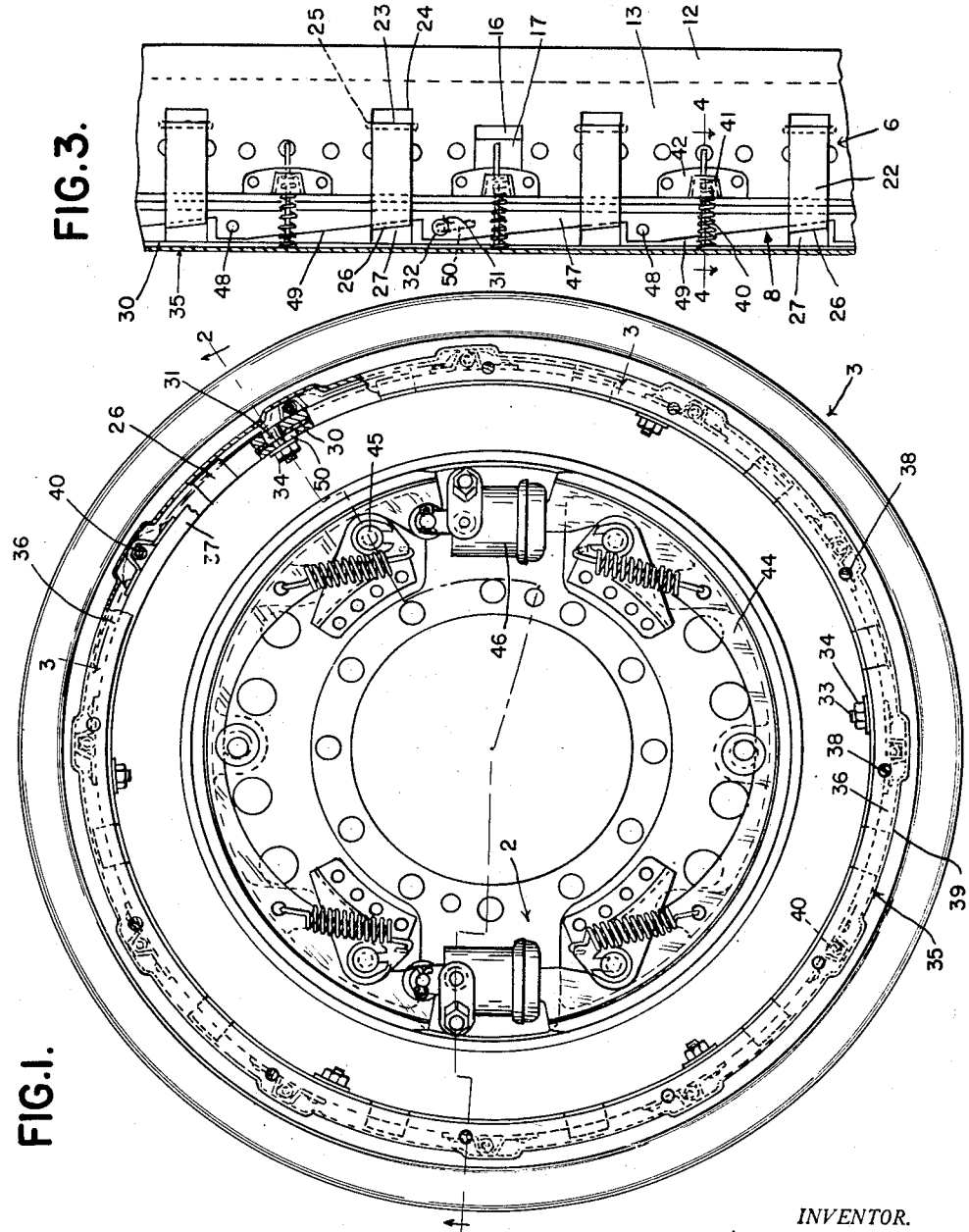

The brake, as illustrated in the drawings, comprises the main brake mechanism 1 and the pilot brake mechanism 2 for applying the main brake mechanism. In the present instance, the brake is shown as applied to an airplane landing wheel 3 which is revolubly mounted on a support comprising the flanged member 4 and the shaft 5 extending in an outboard direction beyond the flanged member.

The main brake mechanism comprises the rotatable outboard, intermediate and inboard friction elements or members 6, 7 and 8, respectively, and the non-rotatable outboard and inboard friction elements or members 9 and 10, respectively. The rotatable friction elements have frusto-conical friction faces for engaging the friction linings 11 secured to opposite sides of corresponding frusto-conical portions of the non-rotatable friction elements and the rotatable friction elements are preferably formed of heavier stock than the non-rotatable friction elements for more efficient absorption of heat generated when the brake is applied. The rotatable outboard friction element 6 is cup-shaped and has the disc 12 and the annular wall 13 extending in an inboard direction from the periphery of the disc. The disc is provided with a frusto-conical friction face for engaging the adjacent friction lining and with a substantially radial portion which is suitably secured to the landing wheel as by means of the bolts 14 and nuts 15. The annular wall 13 is formed with the axially extending openings 16 into which project radial projections 17 at the outer edge of the rotatable intermediate friction element 7. The annular wall 13 is also formed with the enlargement 18 axially inwardly of the openings 16 and encircling and piloting the rotatable inboard friction element 8. The rotatable intermediate friction element 7 is in the nature of a disc provided on its opposite sides with frusto-conical friction faces for engaging the adjacent friction linings. The rotatable inboard friction element 8 has the disc portion 19 provided with a frusto-conical friction face at its outboard side for engaging the adjacent friction lining. The rotatable inboard friction element also has at its outer periphery the axially extending flange 20. The non-rotatable outboard and inboard friction elements 9 and 10 are in the nature of discs having substantially radial central portions each formed with an annular series of holes 21 for slidably engaging the studs 21' extending in an outboard direction from the flanged member 4.

22 are channel-shaped links preferably formed of spring steel operatively connecting the rotatable outboard and inboard friction elements 6 and 8, respectively, and normally rotating the latter with the former. These links extend substantially axially in the normal or off position of the parts and are angularly spaced at equal distances from each other about the annular wall 13 of the outboard friction element and the axially extending flange 20 of the inboard friction element. Each link is provided at its outboard end with the radially inwardly extending portion 23 extending through an opening 24 in the annular wall 13 and abutting the inboard end of the opening. The portion 23 is formed with the lateral projections 25 which extend circumferentially inside the annular wall 13 beyond the openings 24 to thereby retain the outward ends of the links from accidental disengagement from the annular wall. Each link is provided at its inboard end with the radially inwardly extending portion 26 which extends through the opening 27 in the axial flange 20 of the inboard friction element 8 and the opening 28 in the axial flange 29 of the abutment ring 30. The axial flange 29 extends within the axial flange 20 and radial clearance is provided therebetween to provide for contraction of the flange 20 which occurs during operation of the brake. The abutment ring is secured to the inboard friction element by means of the annular series of equally spaced radially extending dowels 31 each of which has a cylindrical head 32 extending through and slidably engaging the axial flange 20 and a threaded shank 33 extending through the axial flange 29 and engaged by the nut 34 cooperating with the dowel head to secure the dowel to the axial flange of the abutment ring. 35 is a sheet metal annular guard having the radial flange 36 secured to the radial flange 37 of the abutment ring by suitable means, such as the screws 38. This ring also has the axial flange 39 which is radially outwardly spaced from the inboard friction element and which also encircles the inboard end portions of the links 22 to hold the same from accidental disengagement. 40 are compression coil springs located circumferentially between the links 22 and having their opposite ends operatively connected to the rotatable outboard and inboard friction elements 6 and 8, respectively, to resiliently hold the same in normal or off position, at which time the links 22 extend axially. Each spring at its inboard end abuts the radial flange 36 of the annular guard 35 and at its outboard end abuts the web 41 of the sheet metal clip 42 into which the outboard end of the spring extends. The clip 42 is suitably secured to the annular wall 13 by suitable means, such as rivets.

The construction as thus far described is such that the rotatable inboard friction element 8 is normally rotated with and at the same rate as the rotatable outboard friction element 6 with the links 22 extending axially. However, when the rotatable inboard friction element 8 is retarded, the links 22 are moved angularly and compel the rotatable inboard friction element 8 to move in an outboard direction into engagement with the non-rotatable inboard friction element 10, thereby forcing the latter against the rotatable intermediate friction element 7, which latter, in turn, is moved in an outboard direction against the non-rotatable outboard friction element 9, which is finally moved into engagement with the rotatable outboard friction element 6.

The pilot brake mechanism 2 for retarding the rotatable inboard friction element 8 of the main brake mechanism comprises the rotatable brake drum 43 and the friction elements 44 engageable with the cylindrical inner friction face of the drum. The drum extends in an inboard direction from the inner end of the rotatable inboard friction element 8 and is preferably integral therewith. The friction elements 44 are brake shoes having friction linings secured to the radially outer faces of their axial flanges and the shoes are carried by the non-rotatable inboard friction element 10. The shoes are adapted to be anchored by the anchor pins 45 secured to the non-rotatable inboard friction element 10 and are adapted to be actuated by the diametrically opposite fluid pressure operated actuators or wheel cylinders 46 which are positioned between and are carried by the end portions of the shoes.

For the purpose of facilitating adjustment of the rotatable outboard and inboard friction elements 6 and 8, respectively, toward and away from each other to secure predetermined clearance between the friction faces of the rotatable and non-rotatable friction elements, there is the cam ring 47 encircling the axial flange 20 of the rotatable inboard friction element 8 and fixedly secured thereto by suitable means, such as the rivets 48. The cam ring is provided with the equally spaced peripherally extending cams 49 on its inboard edge which are engageable with the inturned end portions 26 at the inboard ends of the links 22, these latter portions being cammed to correspond to the angles of the cams 49. The cam ring is also provided with cylindrical openings therethrough for slidably receiving the dowel heads 32, which latter extend through cylindrical openings in the axial flange 20. The axial flange 29 of the abutment ring 30 is provided with the slots 50 through which the dowel shanks 33 extend and the inclination of these slots is the same as that of the cams 49. As a result, when the nuts 34 are loosened, the cam ring 47 and the rotatable inboard friction element 8 may be adjusted toward and away from the rotatable outboard friction element 12 by circumferentially moving or rotating the cam ring and the rotatable inboard friction element, the abutment ring 30 being held from circumferential movement or rotation meanwhile by the links 22 which are held in axial position by the springs 40. This movement through the dowel shanks 33 and the edges of the slots 50 compels the relative axial movement of the rotatable outboard and inboard friction elements. It will be seen that during this adjustment the inturned end portions 26 of the links 22 move over the cams 49 so that when the predetermined adjustment has been secured and the nuts 34 tightened to clamp the dowels 31 to the abutment ring 30, the main brake mechanism is in condition for operation.

With this particular construction, the rotatable outboard and inboard friction elements may be adjusted toward and away from each other independently of the springs 40 inasmuch as they exert a spreading force on the rotatable outboard friction element 6 and the abutment ring 30 which is counteracted by the links 22 extending between the rotatable outboard friction element and the abutment ring.

In the modification illustrated in Figure 5, the cam ring is made integral with the rotatable inboard friction element 51, the remainder of the construction being the same as that illustrated in Figures 1, 2 and 3. More in detail, the axial flange 52 at the outer periphery of the rotatable inboard friction element 51 is formed with the annular series of integral cams 53 which are engageable by the radially inwardly extending end portions 54 of the links 55. The axial flange of the abutment ring 56 is also formed with the annular series of slots 57 having the same inclination as the cams 53 and slidably engaged by the shanks of the dowel pins 58 which correspond to the dowel pins 31. The adjustment of the rotatable inboard friction element toward and away from the rotatable outboard friction element is accomplished in the same manner as the adjustment of Figures 1 to 3, inclusive, and independently of the springs for normally holding the rotatable outboard and inboard friction elements away from each other. It will be noted that in both constructions the inboard friction elements are movable toward the outboard friction elements directly by the links so that the means for securing the inboard friction elements to the abutment rings are relieved from stress.

What I claim as my invention is:

1. A brake comprising rotatable brake members relatively movable toward each other upon retardation of one of said members, means for exerting a braking effort on one of said members when relatively moved toward each other, resilient means for normally relatively moving said members away from each other, and means for relatively adjusting said members toward and away from each other independently of said resilient means.

2. A brake comprising rotatable brake members relatively movable toward each other, a nonrotatable brake device between and engageable with said members upon relative movement toward each other, yieldable means normally acting on said members to relatively move the same away from each other, and means for relatively adjusting said members toward and away from each other independently of said yieldable means.

3. A brake comprising brake members normally rotatable one with the other, means comprising an abutment member for relatively moving said brake members toward each other upon retardation of one of said brake members, yieldable means cooperating with said abutment member for relatively moving said brake members away from each other, and means for adjustably securing one of said brake members to said abutment member independently of said yieldable means to provide for relatively adjusting said brake members toward and away from each other.

4. A brake comprising brake members normally rotatable one with the other, means comprising an abutment member and links extending between one of said brake members and said abutment member for relatively moving said brake members toward each other upon retardation of one of said brake members, yieldable means between said first mentioned brake member and said abutment member for relatively moving said brake members away from each other, and means for adjustably securing the other of said brake members to said abutment member to provide for relatively adjusting said brake members toward and away from each other.

5. A brake comprising a rotatable brake member, a second brake member normally rotatable with said first mentioned brake member, means comprising an abutment ring and links extending between said first mentioned brake member and said abutment ring for relatively moving said brake members toward each other upon retardation of one of said members, spring means between said first mentioned brake member and said abutment ring for relatively moving said brake members away from each other, and means for adjustably securing said second brake member to said abutment ring in various rotative and axial positions of adjustment.

6. A brake comprising a rotatable brake member, a second brake member normally rotatable with said first mentioned brake member, means comprising an abutment ring and links extending between said first mentioned brake member and abutment ring for relatively moving said brake members toward each other upon retardation of said second brake member, spring means between said first mentioned brake member and said abutment ring for relatively moving said brake members away from each other, cooperating means on said second brake member and abutment ring compelling said second brake member to move axially relative to said abutment ring upon rotation of said second brake member relative to said abutment ring, and means for securing said second brake member to said abutment ring in various positions of rotative adjustment.

JOSEPH A. FORBES.